May 16, 1967

H. HOEFT 3,320,567

PRE-STRESSED WINDING ASSEMBLY FOR TRANSFORMERS
AND INDUCTANCE COILS

Filed Nov. 9, 1964

United States Patent Office 3,320,567
Patented May 16, 1967

3,320,567
PRE-STRESSED WINDING ASSEMBLY FOR TRANSFORMERS AND INDUCTANCE COILS
Harry Hoeft, Nurnberg, Germany, assignor to Siemens-Schuckertwerke Aktiengesellschaft, Berlin-Siemensstadt, Germany, a corporation of Germany
Filed Nov. 9, 1964, Ser. No. 409,711
6 Claims. (Cl. 336—197)

My invention relates to winding assemblies for transformers, and inductance coils.

As a rule, the windings of transformers, reactors and other inductive electrical devices must be mechanically stressed in the axial direction when assembled with the appertaining magnet cores. In most cases, the windings are inserted between upper and lower frame structures which are firmly in contact with the iron core and protrude on both axial ends beyond the space occupied by the windings proper. The necessary axial pressure forces are applied and maintained by means of pressure screws which are in threaded engagement with the frame structures and act upon pressure rings or spiders arranged on the respective end faces of the windings. It is also known to subject the windings to adjustable pressure with the aid of tensioning rods of metal extending along the perimetric surface of the winding and acting through pressure members upon the end faces of the winding. Both of these known pressure devices have the disadvantage of requiring heavy structural metal components and leave much to be desired electrically because of the electrical losses occurring in the metal components.

It is an object of my invention to provide a pressure device for transformer and other inductive windings, which avoids the above-mentioned shortcomings and results in a pre-stressed winding assembly of lower over-all weight, smaller space requirements and reduced amounts of material.

According to the invention, the necessary compressing stress is applied to the coils of the winding assembly by tensioning members of non-metallic materials of high tensile strength, preferably shaped as strands or straps, which extend along the perimetric surfaces of the winding and are secured at the respective axial ends to pressure plates adjacent the respective axial ends of the winding.

According to another feature of the invention, the tensioning members consist of glass-fiber reinforced synthetic plastic material, for example on polyester base.

For mounting and stressing the synthetic plastic strands or straps, they are placed and maintained under tension by means of pressure bolts inserted into the pressure plates, or by means of inserted wedges, acting upon the end faces of the winding, preferably through pressure rings.

According to still another feature of the invention, the tensioning members form a bandage of one or a plurality of straps of one or more layers or strips wound about the winding.

According to another, alternative feature of the invention, the tensioning members consist of straps, preferably each comprising a plurality of layers cemented to each other, which have respective eyes on both ends. The members extend through respective openings in the pressure plates and are held at the plates by anchoring members such as wedges, cross pins or the like, passing through the eyes.

The above-mentioned and other advantages and features of my invention, said features being set forth with particularity in the claims annexed hereto, will be apparent from the embodiments of the invention illustrated by way of example in the accompanying drawings, in which:

Figures 1, 3:
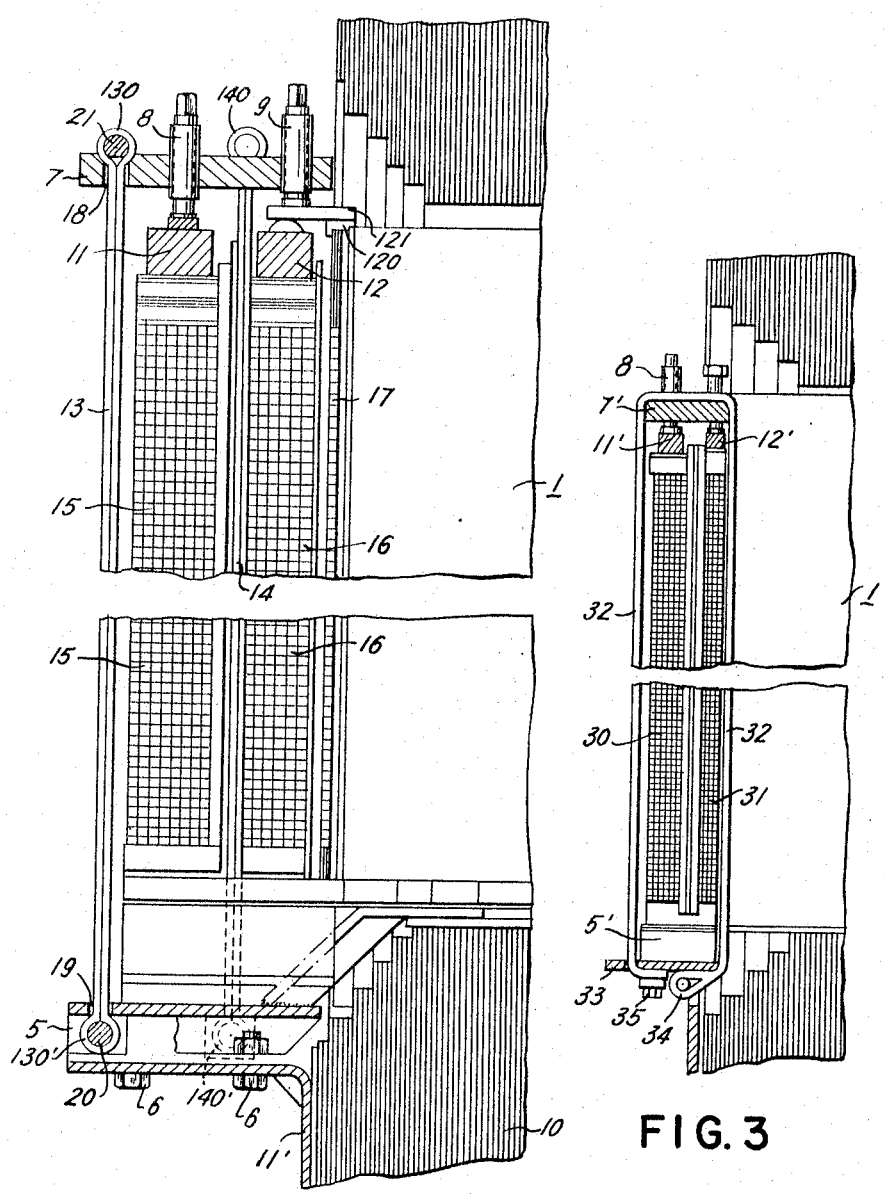
FIG. 1 shows a section through a portion of a transformer equipped with a winding assembly compressed by means of straight tensioning straps.
FIGS. 3 and 4 are sections through other parts of other transformers with winding assemblies having a tensioning device comprising a bandage or one or more straps.
Figure 2:
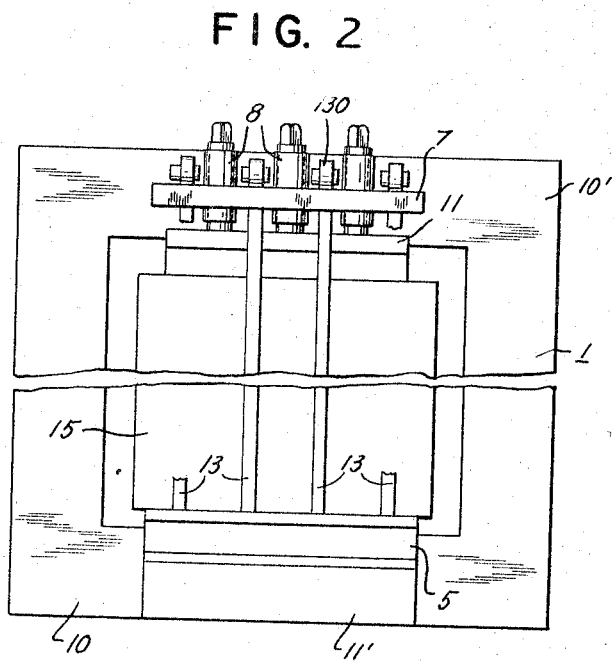
FIG. 2 is a lateral elevation of a transformer corresponding to FIG. 1.

As shown in FIGS. 1 and 2, the laminated iron core 1 of a transformer is composed of a lower three-legged portion 10 and an upper yoke portion 10'. Firmly secured to the lower portion 10 is an angle bracket 11' which is relatively small and light in weight. Placed on top of the bracket 11' are the individual winding portions 15, 16 and 17 which conjointly form a single winding unit, a lower frame structure 5 being interposed between the winding units and the top of bracket 11' and fastened to the bracket by bolts 6. Pressure rings 11 and 12 are placed upon the annular top faces of the individual winding portions. A pressure plate 7 is fixedly mounted above the pressure rings. Such plates are located on both sides of the transformer core above those winding portions that are not covered by the core. Instead of a single pressure plate 7, a number of radially distributed pressure pieces may be provided. The pressure plates or pieces 7 carry pressure bolts 8, 9 in threaded engagement with the pieces. The bolt 8 acts upon the annular end face of winding portion 15 through the pressure ring 11. The bolt 9 bears against a bridge piece 121 which acts through the pressure ring 12 upon winding portion 16 and through another pressure ring 120 upon the innermost winding portion 17.

Tensioning members 13 are peripherally distributed about the outer perimetric surface of the winding 15, each member extending along the winding in a direction parallel to the winding axis. Further tensioning members 14 are arranged and distributed in the same manner in the annular interspace between the winding portions 15 and 16. The tensioning members 13 and 14 are formed of non-metallic materials of high tensile strength, preferably glass-fiber reinforced synthetic polyester plastic. Other synthetic plastics of similarly high strength and good electrically insulating properties are likewise applicable. The tensioning members are preferably shaped as tapes or straps and have their respective ends anchored in the pressure structures 5 and 7 adjacent to the lower and upper axial end faces of the winding. Each strap is formed of two or more layers firmly cemented together so as to form eyes 130, 130' or 140, 140' at both ends. Each eye can be squeezed flat and will then pass through a bore 18 or 19 in the adjacent structure 7 or 5. Thereafter, a pin 20 or wedge 21 is passed into or positioned in the eye for securing the strap to the pressure structures.

Generally, the tensioning members 14, as well as those described hereinafter with reference to FIGS. 3 and 4, consist of non-metallic high-strength materials such as nylon or perlon. Preferably used, however, are glass fiber strands or glass tapes impregnated and internally cemented by epoxide or polyester resins. Such resin-bonded glass fiber strands are available in the trade, for example, from Chicago Printed String Company under the designation fibre glass polyester resin tape, type R (trade name RESI-GLAS), or from Minnesota Mining and Manufacturing Company under the designation fibre glass epoxide resin tape, type 1002 U. Other synthetic plastics of high mechanical strength, particularly those that also constitute good electrical insulators, are likewise applicable, for example, flax or cotton fiber strands embedded in partly polymerized polyester or epoxide resin.

The illustrated device is assembled as follows.

The winding assembly may be put together and placed under stress on the iron core while the top portion 10' of the core structure is removed. However, the winding assembly may also be completed away from the core to be subsequently placed on the center leg of the lower core portion 10 before the top portion 10' is added. In the latter case, the winding assembly can be manufactured and properly prestressed as a unit, to be shipped elsewhere for assemblage with a core.

In both cases, the winding portions together with the appertaining insulation on the end faces and between the individual winding portions are placed upon the lower frame 5 in the conventional manner. Thereafter the assembly or winding portions are compressed to the desired extent with the aid of a suitable clamping jig or a similar auxiliary pressure device. When the desired degree of compression is attained, the individual tensioning straps 13 and 14, previously given the proper length, are passed through the corresponding openings in structures 5 and 7 and are then fastened thereto by means of the cross pin 20, or wedge 21, so that the tensioning straps provide for continued stressing of the assembly after the auxiliary pressure device is loosened and removed. Thereafter the set screws or bolts 8, 9 are adjusted as desired; but this may also be done at a later time, for example after the winding assembly is impregnated.

The tensioning members in devices according to the invention may be given a variety of other designs. If the transformers or other inductive components are rather small, it is particularly advantageous to wind the tensioning members in one or more layers about the winding or a group of coaxial winding units, so that the resulting bandage of one or more straps passes through the central hollow of the winding and the turns of the bandage of one or more straps extend approximately in radial planes about the conductors of the winding.

The embodiment shown in FIG. 3 is of the latter type. The tensioning member 32 consists of an elastic tape made of the above-mentioned synthetic plastic of high tensile strength, preferably polyester resin with embedded glass fibers. The tensioning tape 32 forms loops about the two windings 30 and 31 inclusive of their pressure rings 11', 12' and the pressure plate 7', corresponding to components 11, 12 and 7 in FIG. 1, and also including the lower mounting frame 5' and a lower pressure plate 33 which forms the top portion of an angular mounting bracket substantially as described with reference to FIGS. 1 and 2. One end of the tensioning members, tapes, straps or bandage 32 has an eye 34 traversed by the fixedly mounted fastening pin. The other end is clamped to the pressure structure 33 with the aid of a bolt 35, although various other fastening means are likewise applicable.

Figure 4:
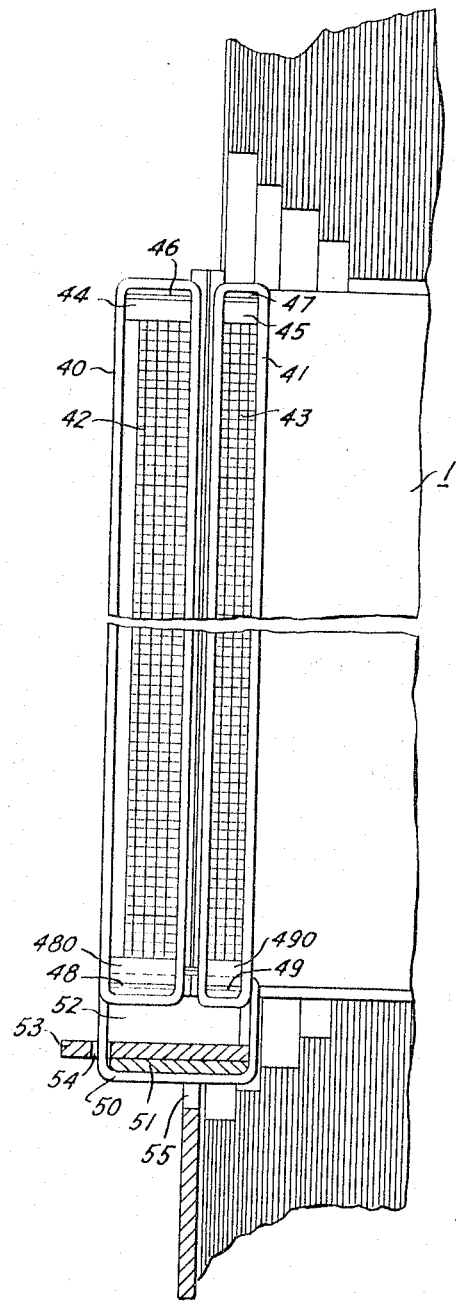

In the embodiment shown in FIG. 4, the tensioning strap members also form loops about the individual coils of the winding assembly. As distinguished from the embodiment of FIG. 3, however, each coil is enveloped by a separate bandage of one or more such tensioning tapes. The outer coil 42 is thus surrounded by a bandage of one or more straps 40, and the inner coil 43 is surrounded by a separate bandage of one or more straps 41. The insulating pressure plates of annular shape 44 and 45, as well as the adjacent wedges 46 and 47 and the ring-shaped parts 48 and 49 adjacent to the lower front faces of the coils, preferably comprise a hard-paper body or a body of glass fiber reinforced epoxide resin and are included in the respective bandages of one or more straps.

The ring-shaped parts 48 and 49 are provided with respective recesses 480 and 490 on the sides facing the coils. The recesses 480 and 490 are located in the area of the respective bandages of one or more straps 40 and 41. An additional bandage of one or more straps 50, each being closed upon itself, is drawn through the recesses 480 and 490 and passes over pressure pieces 52 common to the two coils 42 and 43. The pressure pieces 52 may also be constituted by a single massive ring.

The bandage of one or more straps 50 thus pull the two windings 42 and 43 together and tension them upon the lower frame angle 53 fastened to the magnet core 1. For this purpose, the bandage of one or more strips 50 pass through openings 54 in the horizontal leg of the angle and through openings 55 in the vertical leg of the angle 53. A wedge or double wedge 51 is inserted between the bandage of one or more strips 50 and the horizontal leg of the angle 53 to permit subsequently tensioning the assembly after the strips or layers of the respective one or more layers or bandages are cemented to each other. The two coil bandages of one or more strips 40 and 41 may likewise be tensioned subsequently by means of wedges 46 and 47 which are inserted at the upper coil faces between the respective bandages and the adjacent pressure pieces 44 and 45. The required spacing between the coils 42 and 43 is secured either by the bandages of one or more layers themselves or by inserted wedges of insulating material.

The coil bandages of one or more layers 40 and 41 are applied during the preparing or impregnating treatment of the coils during which they are kept under pressure by means of the auxiliary pressure clamp or jig, namely at a stage when the treatment has progressed to a point when the windings no longer continue settling and thus behave like a virtually inelastic structure. The bandages of one or more straps, then applied in taut condition, are subsequently tensioned to the desired degree by means of the wedges 46 and 47, whereafter the auxiliary pressure clamp or jig is removed. The bandage of one or more layers 50 is applied after the winding assembly is placed upon the lower supporting frame angle 53, and such one or more layers are thereafter tensioned. To prevent loosening of the tensioning wedges, they may be secured in position by means of pins or by cementing.

Stressed winding assemblies according to the invention are considerably lighter in weight than the heretofore available metallic pressure devices involving rather heavy structural components. An improvement is also afforded in electrical respects because of the good electrical insulating properties of the tensioning members. The construction is simple and extremely compact in comparison with the known devices, due to the use of the rather narrow and space-saving tensioning straps. Despite the use of synthetic plastic for the tensioning members, the compressive force to which the winding assembly is subjected can be readily adjusted or subsequently readjusted.

I claim:

1. A pre-stressed winding for transformers and inductance coils, comprising magnetic core means, support means affixed to said magnetic core means and having openings formed therethrough, annular pressure means having recesses formed therethrough, a plurality of coaxially mounted winding means supported in said pressure means, compression means comprising tensioning strips passing around each separate winding means along the perimetric surface of each of said winding means and passing over portions of said pressure means, additional tensioning strips passing through the recesses of said pressure means and through the openings of said support means, and variable pressure applying means for adjusting the tension on said winding means, said variable pressure applying means being mounted in one of said annular pressure means.

2. A pre-stressed winding assembly for transformers and inductance coils, comprising winding means of generally hollow-cylindrical shape having respective axial ends, two annular pressure plates having respective coaxial openings, said winding means being mounted between said two plates and having ends adjacent to said respective plates and coaxially aligned with said openings, tensioning straps of synthetic plastic strand material fastened to said pressure plates and extending along the perimetric surface of said winding means in directions substantially parallel to the axis of said winding means, said straps being distributed about said axis and extending through the hollow of said cylindrical winding means and being wound about said winding means in substantially radial planes so as to form a bandage enveloping said winding means, and variable pressure applying means for adjusting the tension of said winding means, said variable pressure applying means comprising pressure bolts seated in one of said plates and distributed about the opening thereof for exerting pressure against the adjacent end of said winding means.

3. A pre-stressed winding assembly for transformers and inductance coils, comprising winding means of generally hollow-cylindrical shape having respective axial ends, two annular pressure plates having respective coaxial openings and respective pairs of aligned openings, said winding means being mounted between said two plates and having ends adjacent to said respective plates and coaxially aligned with said openings, tensioning straps of synthetic plastic strand material fastened to said pressure plates and extending along the perimetric surface of said winding means in directions substantially parallel to the axis of said winding means, each of said straps comprising a plurality of mutually adjacent layers and forming an eye at each axial end and each of said strands traversing each pair of openings, said straps being distributed about said axis, cross members passing through said respective eyes for anchoring and tensioning each strand at said two pressure plates, and variable pressure applying means for adjusting the tension of said winding means, said variable pressure applying means comprising pressure bolts seated in one of said plates and distributed about the opening thereof for exerting pressure against the adjacent end of said winding means.

4. A pre-stressed winding for transformers and inductance coils, comprising annular pressure means, a plurality of coaxially mounted winding means supported in said pressure means, compression means comprising tensioning strips passing around each separate winding means along the perimetric surface of each of said winding means and passing over portions of said pressure means, and wedge means interposed between said pressure means and said tensioning strips.

5. A pre-stressed winding for transformers and inductance coils, comprising magnetic core means, support means affixed to said magnetic core means and having openings formed therethrough, annular pressure means having recesses formed therethrough, a plurality of coaxially mounted winding means supported in said pressure means, compression means comprising tensioning strips passing around each separate winding means along the perimetric surface of each of said winding means and passing over portions of said pressure means, additional tensioning strips passing through the recesses of said pressure means and through the openings of said support means, and wedge means interposed between said support means and said additional tensioning strips.

6. A pre-stressed winding for transformers and inductance coils, comprising magnetic core means, support means affixed to said magnetic core means and having openings formed therethrough, annular pressure means having recesses formed therethrough, a plurality of coaxially mounted winding means supported in said pressure means, compression means comprising tensioning strips passing around each separate winding means along the perimetric surface of each of said winding means and passing over portions of said pressure means, additional tensioning strips passing through the recesses of said pressure means and through the openings of said support means, said tensioning strips and said additional tensioning strips comprising synthetic plastic strand material, wedge means interposed between said pressure means and said tensioning strips, and additional wedge means interposed between said support means and said additional tensioning strips.

References Cited by the Examiner

UNITED STATES PATENTS

| | | | |
|---|---|---|---|
| 914,941 | 3/1909 | Fortescue | 336—199 X |
| 1,600,963 | 9/1926 | Brand | 336—197 X |
| 1,846,801 | 2/1932 | Finnegan | 336—206 X |
| 2,675,421 | 4/1954 | Dexter | 336—206 X |
| 2,892,168 | 6/1959 | Seidel et al. | 336—199 X |
| 2,900,611 | 8/1959 | Benke | 336—206 X |
| 3,135,888 | 6/1964 | Coggeshall | 336—197 X |
| 3,135,939 | 6/1964 | Fortier | 336—199 |

FOREIGN PATENTS 297,030  7/1929  Great Britain.

LEWIS H. MYERS, *Primary Examiner.*

D. J. BADER, T. J. KOZMA, *Assistant Examiners.*